INVENTOR
J. R. DAVEY
BY
John C. Cassidy
ATTORNEY

Oct. 4, 1960 J. R. DAVEY 2,954,928
ANGLE DIFFERENCE TRANSLATOR
Filed Oct. 12, 1955 5 Sheets-Sheet 2

FIG. 2

COLUMN

|  | 1 | 2 | 3 | 4 | 5 | 6 | 7 | 8 |
|---|---|---|---|---|---|---|---|---|
| | | | CASE I | | | | CASE III | |
| 1 | 000<br>0=-360°<br>000 | 001<br>-315°<br>000 | 010<br>-270°<br>000 | 011<br>-225°<br>000 | 100<br>-180°<br>000 | 101<br>-135°<br>000 | 110<br>-90°<br>000 | 111<br>-45°<br>000 |
| 2 | 000<br>-315°<br>001 | 001<br>-270°<br>001 | 010<br>-225°<br>001 | 011<br>-180°<br>001 | 100<br>-135°<br>001 | 101<br>-90°<br>001 | 110<br>-45°<br>001 | 111<br>0°<br>001 |
| 3 | 000<br>-270°<br>010 | 001<br>-225°<br>010 | 010<br>-180°<br>010 | 011<br>-135°<br>010 | 100<br>-90°<br>010 | 101<br>-45°<br>010 | 110<br>0°<br>010 | 111<br>+45°<br>010 |
| 4 | 000<br>-225°<br>011 | 001<br>-180°<br>011 | 010<br>-135°<br>011 | 011<br>-90°<br>011 | 100<br>-45°<br>011 | 101<br>0°<br>011 | 110<br>+45°<br>011 | 111<br>+90°<br>011 |
| 5 | 000<br>-180°<br>100 | 001<br>-135°<br>100 | 010<br>-90°<br>100 | 011<br>-45°<br>100 | 100<br>0°<br>100 | 101<br>+45°<br>100 | 110<br>+90°<br>100 | 111<br>+135°<br>100 |
| 6 | 000<br>-135°<br>101 | 001<br>-90°<br>101 | 010<br>-45°<br>101 | 011<br>0°<br>101 | 100<br>+45°<br>101 | 101<br>+90°<br>101 | 110<br>+135°<br>101 | 111<br>+180°<br>101 |
| 7 | 000<br>-90°<br>110 | 001<br>-45°<br>110 | 010<br>0°<br>110 | 011<br>+45°<br>110 | 100<br>+90°<br>110 | 101<br>+135°<br>110 | 110<br>+180°<br>110 | 111<br>+225°<br>110 |
| 8 | 000<br>-45°<br>111 | 001<br>0°<br>111 | 010<br>+45°<br>111 | 011<br>+90°<br>111 | 100<br>+135°<br>111 | 101<br>+180°<br>111 | 110<br>+225°<br>111 | 111<br>+270°<br>111 |

ROW

CASE II

INVENTOR
*J. R. DAVEY*
BY
*John E. Cassidy*
ATTORNEY

Oct. 4, 1960

J. R. DAVEY 2,954,928

ANGLE DIFFERENCE TRANSLATOR

Filed Oct. 12, 1955

INVENTOR
J. R. DAVEY
BY
John G. Cassidy
ATTORNEY

Oct. 4, 1960  J. R. DAVEY  2,954,928
ANGLE DIFFERENCE TRANSLATOR
Filed Oct. 12, 1955  5 Sheets-Sheet 4

FIG. 4

| 1 | 2 | 3 | 4 | 5 | 6 | 7 | 8 |
|---|---|---|---|---|---|---|---|
| ANGLE OF NEW DIRECTION CLOCKWISE | ANGLE OF PRESENT DIRECTION CLOCKWISE | CODE | RESISTORS CONNECTED TO −3 VOLTS | RESISTORS CONNECTED TO −35 VOLTS | MAGNITUDE OF EQUIVALENT RESISTOR CONNECTED TO −3 VOLTS | MAGNITUDE OF EQUIVALENT RESISTOR CONNECTED TO −35 VOLTS | MAGNITUDE OF POTENTIAL AT OUTER TERMINAL OF RESISTORS RM1 AND RM2 |
| 0° | 360° | 000 000 000 | NO RESISTORS | R, 2R, 4R, 8R, 16R, 32R, 64R, 128R, 256R (ALL RESISTORS) | OPEN CIRCUIT | $\dfrac{256R}{511} = \dfrac{R}{2}$ * | −35 V. * |
| 45° | 315° | 001 000 000 | 4R | R, 2R, 8R, 16R, 32R, 64R, 128R, 256R | 4R | $\dfrac{256R}{447} = \dfrac{4R}{7}$ * | −31 V. * |
| 90° | 270° | 010 000 000 | 2R | R, 4R, 8R, 16R, 32R, 64R, 128R, 256R | 2R | $\dfrac{256R}{383} = \dfrac{2R}{3}$ * | −27 V. * |
| 135° | 225° | 011 000 000 | 2R, 4R | R, 8R, 16R, 32R, 64R, 128R, 256R | 4/3 R | $\dfrac{256R}{319} = \dfrac{4R}{5}$ * | −23 V. * |
| 180° | 180° | 100 000 000 | R | 2R, 4R, 8R, 16R, 32R, 64R, 128R, 256R | R | $\dfrac{255R}{256} = R$ * | −19 V. * |
| 225° | 135° | 101 000 000 | R, 4R | 2R, 8R, 16R, 32R, 64R, 128R, 256R | 4/5 R | $\dfrac{256R}{191} = \dfrac{4R}{3}$ * | −15 V. * |
| 270° | 90° | 110 000 000 | R, 2R | 4R, 8R, 16R, 32R, 64R, 128R, 256R | 2/3 R | $\dfrac{256R}{127} = 2R$ * | −11 V. * |
| 315° | 45° | 111 000 000 | R, 2R, 4R | 8R, 16R, 32R, 64R, 128R, 256R | 4/7 R | $\dfrac{256R}{63} = 4R$ * | −7 V. * |
| 359.3° | 00.7° | 111 111 111 | R, 2R, 4R, 8R, 16R, 32R, 64R, 128R, 256R (ALL RESISTORS) | NO RESISTORS | $\dfrac{256R}{511} = \dfrac{R}{2}$ * | OPEN CIRCUIT | −3 V. * |

\* APPROXIMATELY

INVENTOR
J. R. DAVEY
BY John E. Cassidy
ATTORNEY

United States Patent Office 2,954,928
Patented Oct. 4, 1960

2,954,928

ANGLE DIFFERENCE TRANSLATOR

James R. Davey, Franklin Township, Somerset County, N.J., assignor to Bell Telephone Laboratories, Incorporated, New York, N.Y., a corporation of New York Filed Oct. 12, 1955, Ser. No. 540,010

5 Claims. (Cl. 235—177)

This invention pertains to telegraph signaling systems and more particularly to data transmission systems. More specifically the invention relates to a system wherein local measurements, expressed in terms of multielement telegraph signal code combinations, are combined with remote measurements, so expressed. The two sets of code combinations are brought into juxtaposition through the medium of telegraphy and applied as operators to an electrical circuit contrived to subject them to some particular mathematical process to afford a required result. Such a system could be applied for instance in the directing of a mobile unit from its present line of motion, such as an airplane from its present line of flight, to a new line of motion. When applied to airplanes, the present line of flight may be determined by measuring in the plane, the angle of the line of flight with respect to a reference line, the line of magnetic north, for instance. The angle of a new line of flight, with respect to the same reference line may be determined, for instance, at a central control station. Both measurements are expressed in terms of code combinations. The combination defining the new line of flight is transmitted telegraphically to the plane. There the two combinations are processed, in a manner to be described herein, to define the difference between the angles, which is an angle through which the plane must turn to the direction of the new line of flight. The angle through which the plane might be required to turn could be any angle between 0 degree and 360 degrees. In the present invention when the required turn in a particular direction is an angle greater than 180 degrees, the angle is translated and expressed in terms of an appropriate angle smaller than 180 degrees through which the plane may turn in the opposite direction to the direction of the new line of flight.

An object of the invention is the improvement of data transmission systems.

A more specific object of the invention is the provision of a system wherein a local measurement is expressed in terms of a signal combination in a code, a remote measurement is expressed in terms of another signal combination in a code, the two signal combinations are brought into juxtaposition through the medium of telegraphy and the two combinations are employed as operators in an electrical circuit designed to implement some mathematical process to afford a desired result.

In the present embodiment of the invention, the two signal code combinations define two angles, and the circuit which implements the mathematical process effects the translation of the signal code combinations into an analog voltage representing the difference between the angles. Equal angular changes throughout the entire range are represented by equal changes in voltage. In other words, the magnitude of the required change in angle and the magnitude of corresponding change in the analog voltage vary linearly. The reason for this is to simplify an indicating or display device on which the analog voltages representing the differences in the angle are impressed. Meters and other well known devices which vary linearly are available to translate the linearly varying voltages directly into indications of corresponding angular magnitudes.

It was mentioned in the foregoing that in the present invention angular differences exceeding 180 degrees are translated into appropriate angles of less than 180 degrees in the opposite direction. The manner in which this is achieved, broadly, is as follows.

All angles the differences between which are greater than 180 degrees, when expressed as pairs of signal code combinations, in the binary code employed herein, have been observed in the present invention to have certain singular distinguishable characteristics, that is to say, each two code combinations, considered as a pair, which define angles the difference between which would be greater than 180 degrees in a particular direction are recognizable as such in paired code combination form. The circuit of the present iniention has been designed in such manner that, in addition to translating code combinations of pairs of angles whose difference is 180 degrees or less into linearly variable analog voltages of such angular differences, it will also identify the pairs of code combinations which would define difference angles greater than 180 degrees and will translate them into analog voltages of appropriate angles smaller than 180 degrees in the reverse directions.

The invention may be understood from the following description when read with reference to the associated drawings, which, taken together disclose preferred embodiments in which the invention is presently incorporated. It is to be understood, however, that the invention is not limited to the present specific embodiments but may be employed in other forms which will be readily suggested to those skilled in the art from a consideration of the following.

In the drawings:

Fig. 2 is a tabulation of paired code combinations, on the observed singular characteristics of which, one aspect of the invention depends;

Fig. 4 is a tabulation used in explaining the invention;

Figure 1:
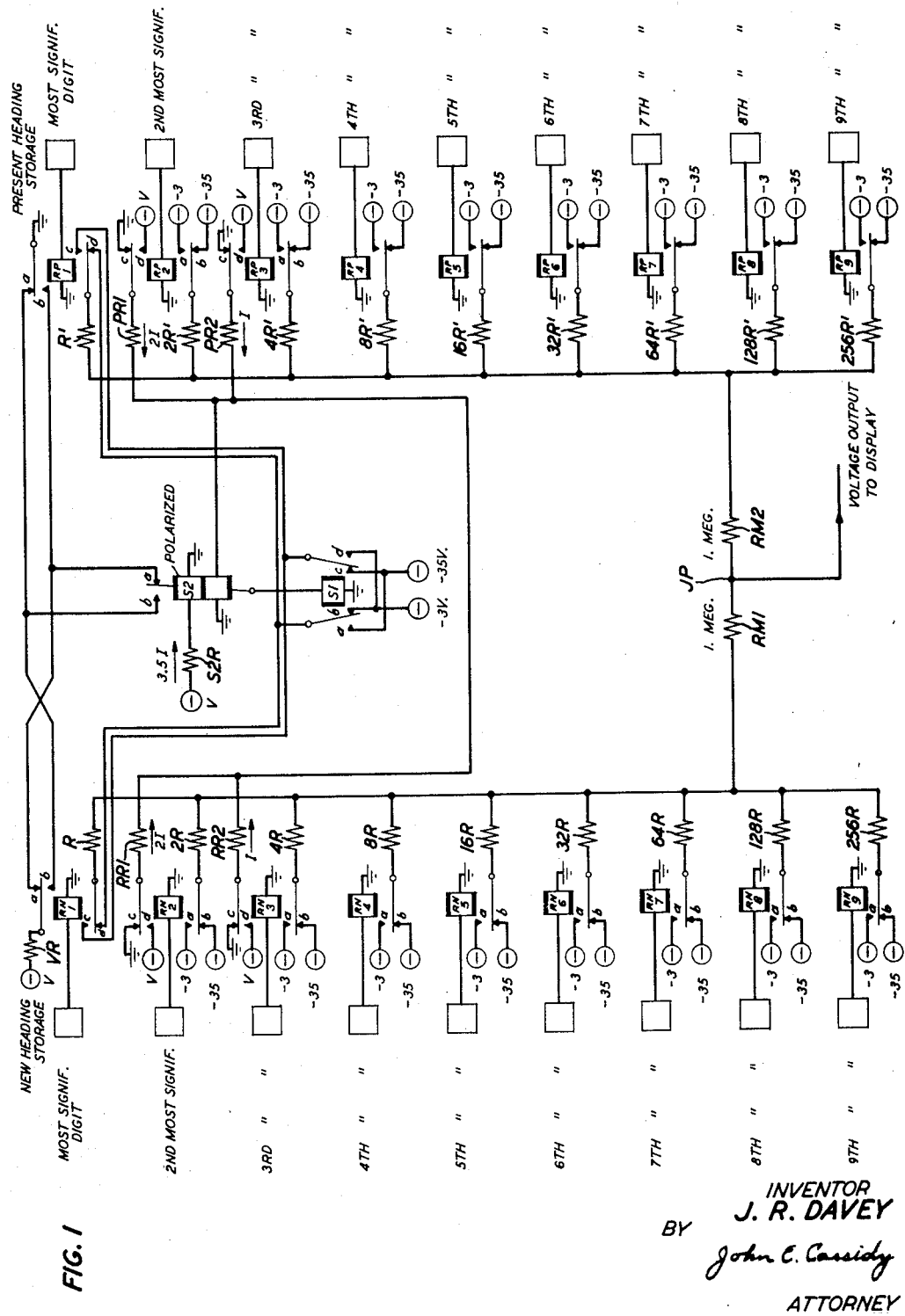
Fig. 1 is the circuit of a preferred embodiment of the invention.

Refer now to Fig. 1. Fig. 1 essentially is a potentiometer circuit having two input branches, on which two individual signal code combinations, defining two individual quantities, are impressed, and having a single output branch on which an analog voltage is responsively produced having a magnitude corresponding to the difference between the magnitudes of the quantities impressed on the input branches. The circuit is arranged primarily to receive on its two input branches code combinations defining the magnitudes of two angles and to produce on its output branch an analog voltage corresponding to the difference in magnitude of the angles. The difference angle defined by the analog voltage in the present embodiment, is intended to be the angle through which a mobile unit such as an airplane in flight is required to turn to reach a new directed line of flight.

The angle measuring and encoding device is not shown herein but is well known in the art. By means of this device the measured angles are translated into code combinations in accordance with the regular binary code. This is performed by means of a code wheel which comprises a mask rotatable on a shaft. The mask has a number of annular rings, one for each element of the code, Each ring has a number of apertures and opaque sections. Combinations in the code are in radial alignment and are brought into registry with an individual light beam for each annular ring at the normal or zero position of the wheel, as the wheel is swept through the measured angle. As the successive combinations defining the successive angles are presented to the light beam, the successive patterns of apertures and opaque sections and of light passed and impeded are in accordance with regular binary code combinations defining successive quantities.

Fig. 1 includes also a feature which, when a difference angle is greater than 180 degrees, translates the angle into an appropriate smaller angle in the opposite direction through which the mobile unit may turn to the new directed line of motion.

In the following when the magnitudes of constants are mentioned it is to be understood that they are cited by way of example and are not to be considered as limitations.

In Fig. 1 there are shown, at the left and right, respectively, nine small squares arranged in a vertical column. The left-hand column is designated New Heading Storage and the right-hand column is designated Present Heading Storage. The squares in each column are designated, from the top down, Most Significant, Second Most Significant, and so on, to Ninth Most Significant, for the bottom square in each column. The nine squares in the left-hand vertical column are intended to represent nine elements of a storage device in which electrical conditions corresponding to a nine-element two condition code signal combination in accordance with the regular binary code may be stored. The order of significance applied to the squares is the order of significance of the digits in the binary code combinations stored therein. Storage devices having individual storage elements for each signal element of a code combination are well known in the art. The information represented by the code combination is a quantity which has been measured and translated into the combination. The measurement may be made anywhere. In the present embodiment of the invention it is assumed that the measurement represents the magnitude of an angle between magnetic north and a new line of flight which an airplane is being ordered to take. The angle, it is assumed, has been measured at a distant control station and the corresponding code combination defining it has been transmitted to a mobile unit by means of radio telegraphy. The nine storage elements shown in the vertical column at the right perform the same function as those in the column at the left except that they are used in the present embodiment to store a nine-element signal combination, expressed in the same code, defining a quantity, such as an angle between magnetic north and the present line of motion of a mobile unit such as an airplane, which angle it is assumed, has been measured in the ariplane.

In the top middle portion of Fig. 1, two relays S1 and S2 are shown. The function of these two relays, in cooperation with relays RN1 and RP1 which are controlled by the condition of the most significant element in each of the impressed code combinations, is to detect paired combinations which if impressed on the potentiometer circuit without modification would produce analog voltages defining angles greater than 180 degrees. Relays RN2 and RN3 and relays RP2 and RP3 also cooperate in performing this function and to translate them into appropriate smaller angles.

Deferring for the present a consideration of how the angle translating portion of the circuit functions, the manner in which the circuit per Fig. 1 operates to translate the impressed combinations into analog voltages defining the difference in their magnitude will first be described. In this preliminary description the difference angles could range from 0 degree to 360 degrees.

Connected to each one of the squares representing a single storage element is a relay winding. The binary codes impressed on the storage devices as has been mentioned have nine elements in each combination. Each element of the code may be of either of two conditions, represented by a 0 or a 1. After a combination has been impressed on a storage device, each of the nine elements in the storage device will be in either of two conditions, depending upon the condition of the corresponding element of the code impressed on the device. When the condition of the element of the code corresponds to a 1, the storage element will operate its connected relay. When the condition impressed on the storage element corresponds to a 0 in the code, the storage element will not operate its relay. Accordingly, each of the nine relays RN1 to RN9 associated with the nine storage elements on the left will be operated or not operated depending upon the pattern of 1's and 0's of the impressed code combination. The same is true for the nine relays RP1 to RP9 shown on the right. When any of the relays RN2 to RN9 is unoperated, as shown, a circuit will be established from a grounded source of potential, such as grounded negative 35 volts, through contact $b$ of the relay and an individual resistor, such as resistor R to resistor 256R, to the left terminal of resistor RM1 which is of very large magnitude relative to the magnitude of resistors R to 256R, through resistor RM1 to junction point JP and then to the analog voltage output conductor, which extends to the display device, not shown.

Similarly, when any of the relays such as RP2 to RP9 is in the released condition, as shown, for the 0 condition of its corresponding code element, a circuit may be traced from a grounded source of potential, such as grounded negative 35 volts, through an individual resistor, such as resistor R' to 256R', which are of the same magnitudes as those of resistor R to 256R, to the right-hand terminal of resistor RM2 which is of very large magnitude relative to the magnitudes of resistors R' to 256R' and of the same magnitude as that of resistor RM1 and through the resistor RM2 to junction point JP to which the output conductor is connected. Because of the manner in which the angle translating relay circuit comprising relays RN1, RP1, S1 and S2 operates, when relay RN1 and relay RP1 are in the released condition as shown, their associated resistors R and R' are each connected to a grounded source of negative potential such as to grounded negative 3 volts. For the present purposes though it will be assumed that resistor R and R' are each connected, as are all of the others forming parts of the potentiometer circuit, to a grounded source of negative 35 volts. The resistors shown in the left-hand input circuit designated R, 2R, 4R, 8R, 16R, 32R, 64R, 128R and 256R have relative magnitudes as indicated by the numerals in the designation for each, and similarly for the group of R' resistors shown at the right. When any of the relays RN2 to RN9 and RP2 to RP9 is operated the associated resistor is connected to −3 volts and it is assumed, for the present, that the same is true for relays RN1 and RP1.

In measuring angles of the present line of flight, in the mobile unit, magnetic north may be used as a reference and defined as the 0 angle; and the angles are measured clockwise. In measuring at the control station for the new direction of motion, angles are measured clockwise also with respect to the same reference. The code permutations for the new direction of motion increase in regular binary succession as the angles increase in uniform amounts. The code combinations for the present direction of motion increase in regular binary succession as the angles decrease in uniform amounts. It will be observed from Table 4 that the code combination for each of the angles of new direction of motion is the same as the code combination for an angle of present direction of motion which is equal to 360° minus the new angle. For instance, the code permutation for a new direction angle of 45° is the same as the code permutation for a present direction angle of 315°, both angles being taken clockwise. The code permutation for a new angle of 90° corresponds to the code permutation for a present angle of 270° both taken clockwise. The code combination for a new and present angle of 180° are identical. The reason for this will become apparent hereinafter.

Refer now to Fig. 4. In this table there are eight columns, numbered 1 to 8 from left-to-right at the top. Column 1 shows the angles of the new directions of motion which the mobile unit may be ordered to take. The angle, as mentioned, is measured clockwise with respect to magnetic north. Column 2 shows the angle of the present direction of motion. The angle is taken clockwise with respect to magnetic north. Column 3 shows the code combination in the regular binary code corresponding to each of these angles. The code combination for a present line of motion of 360 degrees with respect to magnetic north for the mobile unit, would correspond with magnetic north. An angle for a new line of flight of zero would also correspond to magnetic north. For such a condition no change in direction of the mobile unit would be required.

The display device assumed to be controlled by the circuit per Fig. 1, responds to the analog voltages applied to it to indicate the change in angle required. For no change there is no change in the applied analog voltage. The magnitude of the voltage changes and size of the angular changes vary linearly in accordance with the following table. The table shows also the change in angle and the change in analog voltage corresponding to a change in digit in each of the nine significant positions in the combination.

| Significance of Digit | Change in Angle, degrees | Voltage Analog |
|---|---|---|
| 1 | 180 | 16.00 |
| 2 | 90 | 8.00 |
| 3 | 45 | 4.00 |
| 4 | 22.5 | 2.00 |
| 5 | 11.3 | 1.00 |
| 6 | 5.6 | 0.50 |
| 7 | 2.8 | 0.25 |
| 8 | 1.4 | 0.13 |
| 9 | 0.7 | 0.06 |

In the tabulation of Fig. 4, columns 4 and 5 show the resistors which are connected to the −3 volt and to the −35 volt potential, respectively, for the corresponding angles and combinations shown in columns 1, 2 and 3. Columns 6 and 7 show the magnitudes of the equivalent resistors for column 4 and for column 5, respectively. Column 8 shows the magnitude of the potential applied to the left-hand terminal of large magnitude resistor RM1 and to the right-hand terminal of large magnitude resistor RM2.

Figure 6:
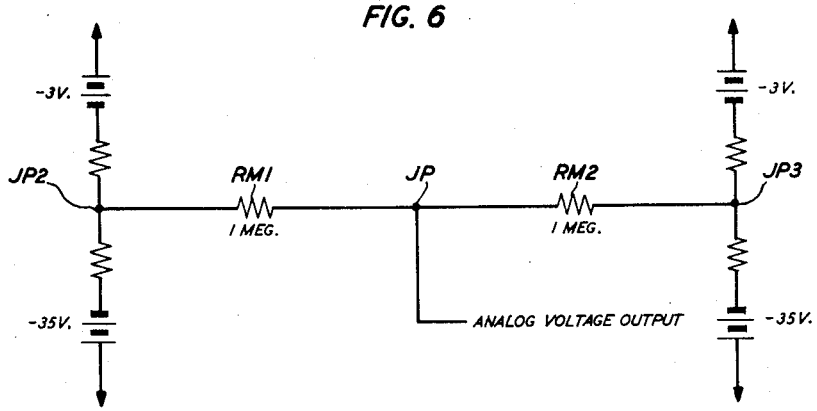
Fig. 6 is the equivalent basic potentiometer of Fig. 1.

Refer now to Fig. 6 which shows the equivalent basic potentiometer circuit of Fig. 1. It will be observed that the potential applied across the right-hand and left-hand vertical branches for conditions other than open circuit conditions is the algebraic difference between −35 volts and −3 volts or −32 volts. The current through each vertical branch and the potential at the junction points JP2 and JP3 may be approximated sufficiently accurately by applying Ohm's law, while neglecting the relatively very large magnitude resistors RM1 and RM2. The potentials will be as shown in column 8 in Fig. 4 for the angles shown.

Attention is called to the −35 volts obtained for both the 0 degree new direction angle and the 360 degrees present direction angle. In this instance a potential of −35 volts is applied to each of the resistors associated with the Second to the Ninth Most Significant digits and is assumed also to be connected to the resistor associated with the most significant digit. There is therefore no connection to any −3 volt source. The full 35 volts is applied in each branch of the potentiometer through resistors having the equivalent magnitude of $$\frac{R}{2}$$

in series with resistor RM1 of very large magnitude on one side, and in series with resistor RM2 of very large magnitude on the opposite side of the potentiometer. The magnitude of $$\frac{R}{2}$$

is negligible with respect to that of either of RM1 or RM2 so that the potential drop across $$\frac{R}{2}$$

is also assumed negligible and it is considered that the full −35 volt potential is applied to the outer terminals of the large magnitude resistors.

It will be observed from a consideration of the equivalent circuit of Fig. 6 that the analog voltage produced at junction point JP is equal to the average of the two potentials applied to junction points JP2 and JP3. This is so because the values of large magnitude resistors RM1 and RM2 are equal and the potential drop between junction points JP2 and JP will be equal to the potential drop between junction points JP and JP3. Further, it will be observed from a consideration of the tabulation in Fig. 4, that the relationship between the size of the angular change and the magnitude of the analog voltage change is linear.

Refer now to Fig. 2 which is a tabulation of the first three digits of pairs of combinations in the regular binary code having all possible permutations of the first three digits. The difference between the magnitudes of the angles defined by each pair of combinations is shown adjacent the pair. This assumes that all of the six least significant digits in each combination are zeros. In the paired combinations, the upper and lower combination represent the new command angle and the present angle, respectively, both of the angles being taken clockwise with respect to magnetic north, and the difference angle, or θ, as it will be called hereinafter, is the angle obtained by subtracting the present angle from the new angle. This is expressed as a negative angle when the present angle is the larger.

Study of the paired combinations in Fig. 2 discloses that paired combinations defining angles the difference between which is greater than 180 degrees all have singular characteristics different from other combinations by means of which such combinations may be identified.

The paired combinations in the tabulation of Fig. 2 are separated by stepped lines into three groups for three different conditions or cases, designated Case I, Case II and Case III in the figure.

In the paired combinations grouped together as Case I, θ in each instance is more than 180 degrees. Further it will be observed that the first digit in each of the paired combinations is a 0. In the combinations grouped together in Case II the angular difference is 180 degrees or greater and the first digit in each of the paired combinations is a 1. Reference to the tabulation in Fig. 2 will disclose also that if the first digit in each of the paired combinations in Case I is changed from 0 to 1 the difference between the angles for each pair of combinations will be changed from θ to a smaller angle 360 degrees −θ.

To illustrate the forgeoing, consider the paired combination in row 1, column 3

010
000

The upper combination 010 is the new command heading and is taken clockwise. Reference to Fig. 4, columns 1 and 3 show that the angle is 90 degrees. The lower combination 000 is the present aircraft heading and is taken clockwise. Reference to Fig. 4, columns 2 and 3 show that the angle is 360 degrees which coincides with magnetic north. The difference between the angles, or $\theta$, would be 90 degrees —360 degrees or —270 degrees. It would be preferable obviously to turn 90 degrees in a clockwise direction to the new line. This would be the indication, if the first 0 in each of the first two combinations were changed to 1's. The paired combinations then would be 110
100

The substituted angle for the upper combination then would be 270 degrees clockwise. The substituted angle for the present line then would be 180 degrees clockwise. The difference angle $\theta$ would be 270 degrees —180 degrees or +90 degrees. This would indicate a turn from the true present line of flight, which is in the direction of magnetic north, through a 90-degree angle in the clockwise direction to the new line of flight. It is apparent that the final direction assumed by the plane is the same in either case but the required turn in the latter instance would be more direct, through a smaller angle.

With respect to the paired combinations for the group designated Case II, changing the first 1's in each of the paired combinations to 0's performs the same function as described for Case I.

The relay circuit in Fig. 1 which effects a translation in accordance with the foregoing will now be described.

Attention is first called to characteristics of certain of the paired combinations in the Case III group. The pairs of combinations in row 2, column 4, row 3, columns 3 and 4, and row 4, columns 2, 3 and 4, each have 0's as the first significant digit. The difference angle $\theta$ however, is 180 degrees, 135 degrees or 90 degrees. Further, in the case of angles of 180 degrees, whatever the digits in the six least significant places, whether 0's or 1's, the difference angle $\theta$ cannot be greater than 180 degrees. Notwithstanding both of the first significant digits of each of these pairs are 0's, it is desirable that the angle should not be translated. It is the function of relay S2 to prevent translation under this condition. This is performed by controlling relay S2 responsive to the condition of the Second and Third Most Significant digits of these combinations. It has been observed that each of these pairs of combinations of Case III, having 0's as the first digit of each of the combinations of the pair, considered as a three digit binary combination, has digits in its Second and Third Most Significant positions which, when evaluated according to the digit values in the regular binary code for each combination of the three digit pair and then added together, give a total of a magnitude greater than that of the combined second and third digits of both combinations of any pair of Case I when similarly evaluated.

Specifically, consider the pair of combinations in row 2, column 3. It is 010
001

The most significant digit of each combination of the pair is 0. The most significant digit in each combination is not taken into further consideration. The second and third digit of the top and bottom combinations are 10 and 01, respectively. In the combination 10 the 1 counts as $2'$ or 2 and the 0 for 0. The top combination therefore counts for 2. In the combination 01, the 0 counts for 0 and the 1 for $2^0$ or 1. The bottom combination, therefore, counts for 1.

The total for the two combinations then is 2+1 or 3. There are 10 pairs of combinations in Case I. If the totals of the second and third digit of each of the 10 pairs is evaluated according to the foregoing it will be found that no pair has a value greater than 3.

Now consider each of the six paired combinations in Case III in which the first digit in each pair is 0 and it will be found that each has a value equal to 4 or more. Specifically, consider the paired combination in row 2, column 4, which is 011
001

The top combination evaluated in binary codes $2'+2^0$ or $2+1=3$. The lower combination gives $2^0=1$. The sum $3+1=4$. It will be observed that each of the other five paired combinations in Case III having 0's as the first significant digits, when similarly evaluated, equals 4 or more. It is therefore possible to distinguish between pairs of combinations in Cases I and III in which the first digits are 0's.

Now a comparison will be made between the evaluations in the binary code of the second and third digits of the pairs in Cases II and III in which the first digit of each of a pair of combinations is 1. In each such instance in Case III the value of the angle is less than 180 degrees. In Case II each angle is 180 degrees or greater. In the case of angles of 180 degrees, if any of the six least significant digits in either of a pair of combinations is a 1 the angle is greater than 180 degrees.

First consider Case II and specifically the pair of combinations in row 6, column 8. The pair is 111
101

The two right-hand digits of the upper combination are 11 and evaluate at $2'+2^0$ or $2+1=3$. The two right-hand digits of the lower combination are 01 and evaluate at $2^0=1$. The total is therefore $3+1=4$. There are five other pairs of combinations in this group and it will be found on examination that the totals for each of these pairs similarly evaluated is 4 or greater for each pair.

There are ten pairs of combinations in Case III in which the first digit in each pair is 1 and it will be found upon evaluating the two right-hand digits of each of these in the described manner that none has a total value of more than 3. It is therefore possible to distinguish between pairs of combinations in Cases II and III in which the first digit of each of the combinations of the pair is a 1.

How advantage is taken of the differences described in the foregoing, to identify pairs of combinations having the same most significant digits and convert those when the difference angle is greater than 180 degrees and prevent conversion when the difference angle is less than 180 degrees will now be described.

Refer now to Fig. 1. The operation of Fig. 1 was previously described on the assumption that there was no translation, whatever the magnitude of the angle. Now the manner in which the relay circuit functions to translate an angle greater than 180 degrees into an appropriate smaller angle, will be described.

First let it be assumed that the most significant digits of a paired combination are different and, more specifically, that the most significant digit of the combination for the new command heading is a 1 and for the present aircraft heading is a 0. Relay RN1 will be operated. Relay RP1 will be released.

A circuit may now be traced from a grounded source of potential V through resistor VR, contact $b$ of relay RN1 and contact $a$ of relay RP1 directly to ground. The path to direct ground shunts the path which extends to contact $b$ of relay S2, so that no matter what the condition of relay S2, relay S1 will be in the released condition, which is opposite to that shown on the drawing. A circuit may now be traced from a grounded source of negative 3-volt potential through contact $d$ of relay S1, contact

*c* of relay RN1 and resistor R to the left-hand terminal of resistor RM1. A circuit may also be traced from a grounded negative source of 35-volt potential through contact *a* of relay S1, contact *d* of relay RP1 and resistor R' to the right-hand terminal of resistor RM2. It will be remembered that a 0 digit in any position in a combination normally effects the connection of negative 35-volts potential through its individual resistor to the outer terminal of the associated large magnitude resistor RM1 or RM2 and a 1 digit substitutes negative 3 volts for the negative 35 volts. Since in no case when the most significant digit of each of the two combinations of a pair are different is any translation required, the translating circuit connects the normal potentials, that is negative 3 volts for the 1 and negative 35 volts for the 0, to the respective branches.

Now let it be assumed that the most significant digit of the new heading combination is 0 and of the present aircraft heading is a 1. Relay RN1 will be released and relay RP1 will be operated. A circuit may now be traced from a source of potential V, through resistor VR, contact *a* of relay RN1 and contact *b* of relay RP1 to direct ground. The path to direct ground shunts the path through contact *a* of relay S2 and the winding of relay S1 to ground. So no matter what the condition of relay S2, relay S1 will be released, opposite to that shown on the drawing. A circuit may now be traced from negative 3 volts through contact *d* of relay S1, contact *c* of relay RP1 and resistor R' to the right-hand terminal of resistor RM2. Another circuit may be traced from negative 35 volts through contact *a* of relay S1, contact *d* of relay RN1 and resistor R to the left-hand terminal of resistor RM1. In this instance too, since the most significant digit of each combination of a pair is different and the difference between the angles less than 180 degrees, the potentials applied to the branches of the potentiometer are the normal negative 35 volts for a 0 and negative 3 volts for a 1.

Now let it be assumed that the most significant digit of each of two paired combinations is a 0. Both relay RN1 and RP1 will be released. Relay S2 is a polar relay having two equal windings. The upper is a so-called biasing winding. It is supplied, from a source of grounded fixed potential through resistor S2R and the upper winding of relay S2 to ground, with a fixed current of a magnitude of 3.5 units, which tends to activate its armature to engage with its upper contact *a*. The effect of the current in the upper winding is opposed by the effect of the current in the lower winding, the magnitude of which depends upon the total evaluation of the Second and Third Most Significant digits of the two combinations of the pair as described in the foregoing. It will first be assumed that the magnitude of the current does not exceed 3 units in which case translation is required. For this case the effect of the current in the upper winding of relay S2 is preponderant over the counter effect of the current in its lower winding and the armature of relay S2 engages its upper contact *a* as shown on the drawing. The circuit from potential source V through resistor VR and contact *a* of relay S2 is extended through the winding of relay S1 to ground operating relay S1 as shown on the drawing. A circuit may then be traced from the grounded negative 3-volt source through contact *b* of relay S1, and then in parallel through contact *d* of relays RN1 and RP1 and resistors R and R' to the outer terminals of resistors RM1 and RM2 respectively. It has been explained that for the 0 condition of the most significant digit of each of a pair of combinations, when translation was to be effected the potential applied to each of the resistors should be negative 3 volts. This changes the angle as has been explained to the smaller more appropriate angle.

Now it will be assumed that the most significant digits of a pair of combinations are both 0's but that the total magnitude of the Second and Third Most Significant digits of the combination when evaluated in binary code and added together is 4 or more in which case the difference angle θ is less than 180 degrees and translation is not to be effected. Relays RN2, RN3, RP2 and RP3 each are arranged so that when they are operated they supply current to the bottom winding of relay S2. Relays RN2 and RP2 when operated each supply 2 units of current over paths from sources of potential V through their respective contacts *d* and resistors RR1 and PR1 respectively to the lower winding of relay S2. Relays RN3 and RP3 when operated each supply 1 unit of current over paths from sources of potential V through their respective contacts *d* and resistors RR2 and PR2 respectively to the lower winding of relay S2. For the condition assumed the operated relays of the group RN2, RN3, RP2 and RP3 will supply at least 4 units of current to the lower winding of relay S2, operating the relay. For the conditions assumed also, with both of the most significant digits 0, relays RN1 and RP1 will both be released. With relay RN1 released, the path from potential source V through resistor VR will be open at contact *a* of relay S2. With relay RP1 released the path from ground through contact *a* of relay RP1, contact *b* of relay S2 and the winding of relay S1 to ground will be terminated in ground at both ends. Relay S1 will be released. This, as has been shown, connects the normal negative 35-volt potential to both branches of the potentiometer circuit so that no translation is effected.

Now the conditions which prevail when each of the most significant digits is a 1 will be described. Relays RN1 and RP1 will both be operated. It has been shown in the foregoing that for pairs of code combinations according to Case II all of which require translation, the total of the evaluation of the Second and Third Most Significant digits of the two combinations of the pair is 4 or more. For such a condition relay S2 will be operated as described. A circuit may then be traced grom a grounded source of potential V through resistor VR, contact *b* of relay RN1, contact *b* of relay S2 and the winding of relay S1 to ground operating relay S1. It will be recalled that normally any 1 digit in a combination connects a negative source of 3-volt potential to its respective branch of the potentiometer. In this instance we have 1 as the most significant digit of each combination, but the difference angle defined exceeds 180 degrees so translation is required in which case the negative 35-volt source is substituted for the negative 3-volt source. It will be observed that this is so. The circuit may be traced from a grounded source of negative 35-volt potential through contact *c* of relay S1 and then in parallel through contacts *c* of relay RN1 and RP1 and resistors R and R' to the outer terminals of resistor RM1 and RM2, respectively.

There now remains to be described the manner in which the circuit of Fig. 1 prevents translation when the most significant digit of each of a pair of combinations is a 1, but the difference angle θ is less than 180 degrees in which case translation is not required and the normal —3 volt potential source should be connected to both arms of the potentiometer. For this condition, for reasons which should be understood from the foregoing relays RN1 and RP1 are both operated. Relay S1 is released as the current supplied to its lower winding will be less than the biasing current of 3.5 units. The circuit from the grounded source of potential V through resistor VR and contact *b* of relay RN1 will be open at contact *b* of relay S2 and contact *a* of relay RP1. The circuit extending from ground through contact *b* of relay RP1, contact *a* of relay S2 and the winding of relay S1 to ground is grounded at both terminals so relay S1 is released. Under this condition the normal negative 3-volt source is connected through contact *d* of relay S1 in parallel through contact *c* of relays RN1 and RP1 and resistors R and R' to the outer terminals of resistors RM1 and RM2, respectively.

In summation, and as has been heretofore explained, in cases where the difference angl θ is greater than 180 degrees, both of the most significant digits of a paired combination defining the angles of the pair are the same and the angle may be translated into an appropriate smaller angle by reversing the potential applied to each of the potentiometer resistors individual to the most significant digit. There are, however, pairs of combinations defining angles, the difference between which angles is less than 180 degrees and which do not therefore require translation, in which the most significant digits have the same distinguishing characteristic as that of the pairs of combinations defining greater angles which do require translation. That is to say, both of the most significant digits are the same in certain pairs of combinations which have difference angles less than 180 degrees. These can be distinguished from combinations having different angles which do require translation by differences between the combined Second and Third Most Significant digits of the paired combinations which do and do not require translation. These differences may be noted by considering the most significant three digits of the code combination as being the entire code combination. The second and third digits are evaluated according to their regular binary values in a three-digit combination and the value for these two digits for each combination of a pair are added together. The total thus obtained for any paired combination having the same most significant digit, whether a pair of 0's or a pair of 1's, having a difference angle greater than 180 degrees and requiring translation is distinguishable from the corresponding total for any paired combination having the same most significant digit but having a difference angle less than 180 degrees and not requiring translation. The relay circuit is operated to translate in one instance and to prevent translation in the other in response to controls dependent on these relationships.

Up to the present it has been assumed that all difference angles greater than 180 degrees are translated into appropriate smaller angles and that no difference angle less than 180 degrees is translated into a corresponding larger angle. However, dependent on the number of digits employed in the code combinations, there is a range in which, for particular paired combinations, difference angles less than 180 degrees may be translated into corresponding greater angles and difference angles greater than 180 degrees may not be translated. The accuracy of the circuit is not impaired. That is to say, the mobile unit is accurately directed to its ordered new line of flight, but in one range, for particular combinations, it may be directed to turn through a larger angle than necessary and in another range, when it might advantageously be directed through a smaller appropriate angle to the new ordered line of flight, it will for particular paired combinations be directed through the normal larger angle.

On reflection, it will be apparent that, with respect to these particular combination in the latter range, that is for the particular combinations in the range in which the mobile unit may not be directed through a smaller appropriate angle, while there is no benefit afforded by the translating feature of the present invention, neither is there any disadvantage incident to its use, because the turn for particular combinations in this range is the same as it would be were the translating feature not incorporated in the circuit. With respect to the particular combinations in the range through which the mobile unit is required to turn through a larger angle than would be the case were the translating feature not incorporated in the circuit, there is a disadvantage, but these combinations through this range of angles are few relative to the total number of combinations for which the circuit is effective to reduce the size of angles through which turning to the new line of flight is necessary.

To illustrate the foregoing, consider the pair of combinations in the first row fourth column of Fig. 2. The combination is 011
000

Assuming that the remaining six digits of each nine-digit combination are all zeros, the upper combination is 011 000 000 and defines a new command heading of 135 degrees measured, it is assumed, clockwise with respect to magnetic north. The lower combination is 000 000 000 and defines a present aircraft heading of 360 degrees measured clockwise with respect to magnetic north which is also magnetic north. The difference between the two angles following the convention of subtracting the angle of the present heading of 360 degrees from the new heading of 135 degrees is negative 225 degrees. The new line of flight could be reached by turning the aircraft counter clockwise through this angle. However, the translator operates to indicate a clockwise turn through the smaller angle of 135 degrees to the new commanded line.

Now consider that the six remaining digits of the same pair of combinations are all ones, which is the most contrasting situation. The combination for the new heading then becomes 011 111 111. Reference to Fig. 4 indicates that this angle would be just slightly less than 180 degrees clockwise. The combination for the present aircraft heading then becomes 000 111 111. Reference to Fig. 4 indicates that this angle is slightly greater than 315 degrees clockwise. For the pair of combinations the difference angle θ is a little greater than negative 135 degrees. However, applying the tests of the same digits, namely 0, in the first significant position of each combination of the pair and a total binary value of 3 for the combined Second and Third Most Significant digits of the two combinations, when added, the combinations will be translated. The combination for the new heading then becomes 111 111 111 which defines an angle just less than 360 degrees. The combination for the present aircraft heading then becomes 100 111 111 which defines an angle slightly greater than 135 degrees. The difference between the two angles is slightly less than positive 225 degrees. Turning through this angle brings the aircraft correctly to the new line of flight, but the turn is greater than is necessary. However, the number of times when this will be necessary will be very many fewer than the number of times that the aircraft will be directed through a shorter angle than would be possible without the translating feature.

Figure 3:
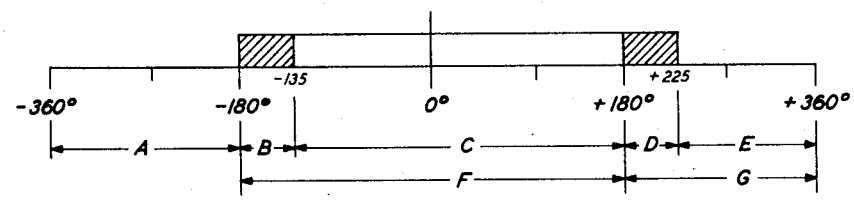
Fig. 3 is a diagram used in explaining the invention.

The diagram per Fig. 3 more graphically illustrates the effective translating and non-translating ranges of the present arrangement. In this figure distances scaled to the right and left of the center, marked 0, represent positive and negative difference angles θ from −360 degrees to +360 degrees. It would be desirable that there be no translation in the range from −180 degrees to +180 degrees, represented by F, and that there be translations in the range to the left of −180 degrees up to −360 degrees, represented by A, and to the right of +180 degrees up to +360 degrees, represented by G. However, there is translation, as desired, in the range from −180 degrees to 360 degrees represented by A. There is possible translation in the range B from, −180 degrees to −135 degrees, where it is desirable that there be none. It is possible, but not certain, because many of the pairs of combinations in this range will not be translated. There is no translation, as desired, in the range C, from −135 degrees to +180 degrees. Certain of the pairs of combinations defining difference angles in the range D, from +180 degrees to +225 degrees, will not be translated, although it is desirable that all should be. And, finally, there will be translation, as desired, of all difference angles in the range E, from +225 degrees to +360 degrees.

Attention is again particularly called to the fact that in the range B, where translation is not desirable, a large percentage of the pairs of combinations defining difference angles in this range will be such that there will in fact be no translation. Further, with respect to range D, a large percentage of the pairs of combinations defining difference angles in this range will be such that the desired conversion will in fact be effected.

Attention is also called to the fact that by increasing the number of digits in the code combinations, which are evaluated in controlling relay S2 it is possible to reduce the range B and the range D to make it so small as to be negligible.

With relation to Fig. 2 increasing the number of digits in a combination which are evaluated in controlling relay S2 would tend to smoothen the irregularities in the broadly stepped boundary lines between the combinations of Cases I and III and between the combinations of Cases II and III.

Figure 5:
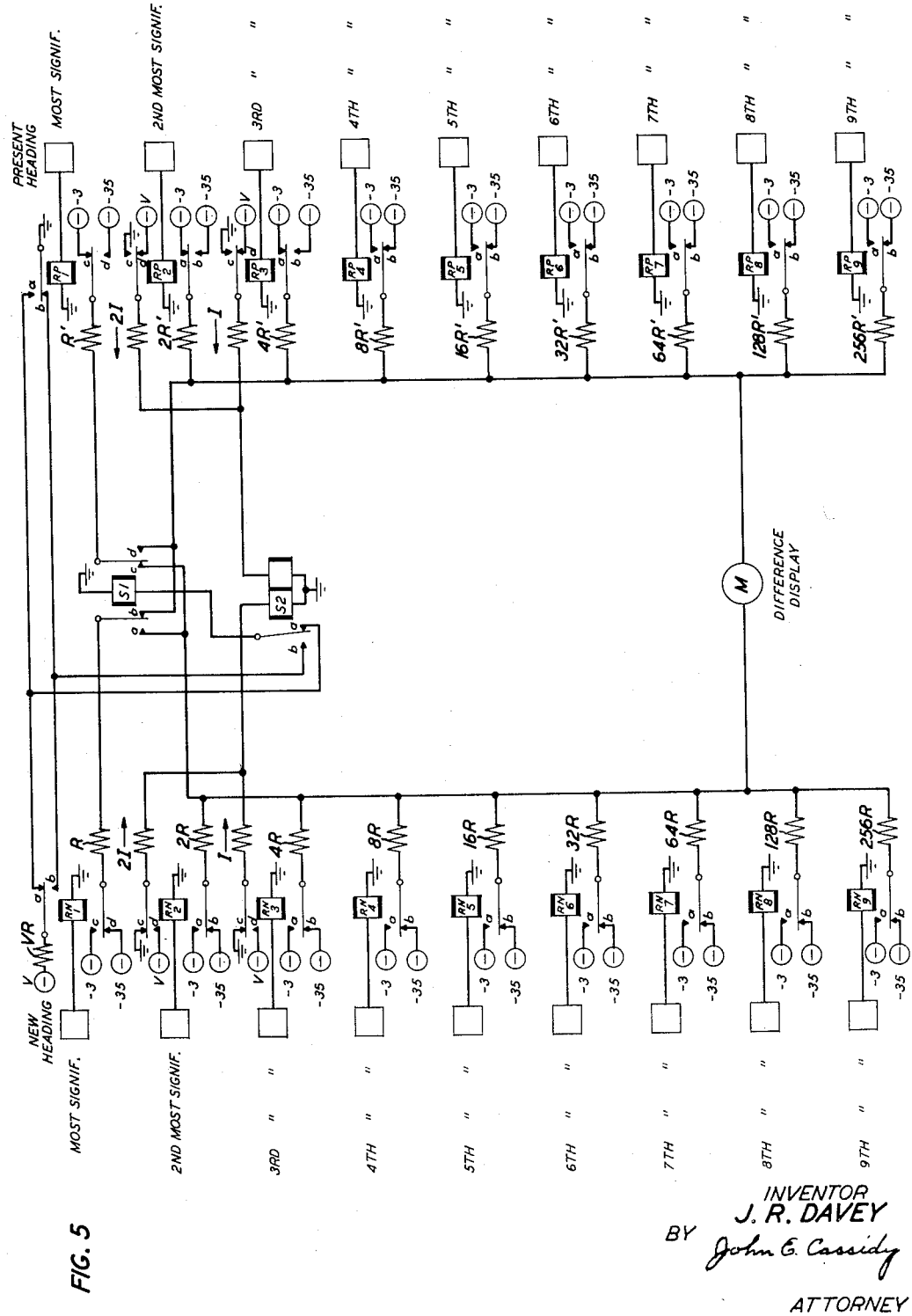
Fig. 5 is a circuit of a second preferred embodiment of the invention.

Fig. 5 shows a second embodiment of the invention which has the characteristic that it can operate into a display device which can float with respect to ground, such as a milliammeter type instrument. In this embodiment the same code combination is assigned to the same angle for both the new and present heading, rather than to one angle and the difference between the one angle and 360 degrees, as shown in Fig. 4. The angles are taken in the same sense with respect to the reference, magnetic north, for instance. The two evaluated voltages are directly opposed through the indicating device, such as the milliammeter M.

Relays S1 and S2 again serve to limit the difference to a ±180 degree range. When the most significant digits are different, and the algebraic sum of the second and third digits are different in the same sense as are the most significant digits, the difference between the two angles exceeds 180 degrees.

A tabulation of paired combinations corresponding to that shown in Fig. 2, which applies to the circuit of Fig. 1 is not presented herein for the embodiment of Fig. 5. However, it can be seen from Fig. 4, that when the code combinations for the same size angles are the same, for angles which differ by 180 degrees, or more, the most significant digit of combinations defining them differ. It is also apparent that where the difference in angle is greater than 180 degrees, when the second and third digit of one combination are added together and compared with the total for the second and third digit of the other combination of a pair, the total of the second and third digit for the combination having 1 as the first digit will be greater than the corresponding total for the combination leaving 0 as the first digit.

In Fig. 5, as in Fig. 1, negative 35 volts is connected to the resistor individual to a digit in a combination when the digit is 0 and negative 3 volts when the digit is a 1.

Reference to Fig. 5 indicates that it is arranged to function in a manner to implement the observed relationships. In Fig. 5 apparatus elements having functions corresponding to elements in Fig. 1 have designations similar to those in Fig. 1. In Fig. 5, to illustrate the operation, it is assumed that all of the digits of the new heading combination are 0's and that the first 3 digits of the present heading combination are 1's and the remaining 6 are 0's. Since the first digit of the new heading is 0 and of the present heading is a 1, and the sum of the second and third digits of the present heading is greater than the sum of the second and third digits of the new heading, translation is required. The relays individual to the first, second and third digits of the present heading combination are operated since the digit is assumed to be 1 for each. The effect of the current supplied to the right-hand winding of relay S2 is dominant, as no current is supplied to its left-hand winding. Relay S2 is therefore operated. A circuit may be traced from a grounded source of potential V through resistor VR, contact $a$ of relay S2 and the winding of relay S1 to ground operating relay S1. This reverses the potential applied to the resistors associated with each of the first digits. Normally the potential applied as a result of the 0 condition by relay RN1 would be negative S5 volts and by relay RP1 as a result of the 1 condition would be —3 volts. Attention is called to the fact that the values of resistors R and R' are the same, and that it makes no difference if they are interchanged in the two sides of the potentiometer provided the magnitudes of the potentials applied through them are proper. Attention is also called to the fact that in this circuit, as in the circuit of Fig. 1, a translation requires that the potential applied by each of the relays associated with the first digit be reversed with respect to the normal potential for the value of the digit. For the 0 condition of the first digit of the new heading combination, as a result of the translation, a circuit may be traced from a source of grounded negative 3 volts through contact $c$ of relay RP1, resistor R' and contact $c$ of relay S1 directly to the left-hand terminal of the display device, such as milliammeter M. For the 1 condition of the first digit of the present heading combination, as a result of the translation, a circuit may be traced from a grounded source of negative 35-volt potential through contact $d$ of relay RN1, resistor R and contact $b$ of relay S1 to the right-hand terminal of milliammeter M. The milliammeter M will give an indication proportional to the difference in voltage applied to its terminals.

It is considered that the manner in which Fig. 5 operates for the other conditions will be understood from the description of the operation of Fig. 1 herein.

What is claimed is:

1. A telegraph system having a first and a second multiunit storage circuit for storing the signal elements of a first and a second multielement permutation code combination, respectively, said combinations defining a first and a second quantity, respectively, a first and a second plurality of switches each including a switch individual to each of the units of said first and said second multi-unit storage circuit, respectively, each said switch responsive to the condition of its respective unit, an individual lumped impedance element controllable by each said switch and a potentiometer having a first and a second branch comprising said impedance elements controllable by said first and second plurality of switches, respectively, said branches selectively variable responsive to the disposition of said impedance elements by said switches, so as to define the difference between said quantities.

2. A telegraph system having a circuit for defining the difference between two quantities, said circuit having a first and a second group of switching elements, a first and a second group of resistors, an individual resistor in each of said first and second group of resistors responsive to an individual one of said switching elements in said first and second group of switching elements, respectively, and a potentiometer having a first and a second branch, means for impressing a first and a second multielement permutation code signal combination defining a first and a second quantity, respectively, on said first and said second group of switching elements, respectively, means responsive to the impressing of said conditions for selectively actuating switching elements of said first and said second group of switching elements, respectively, and means responsive to said actuating for selectively connecting resistors of said first and second group in said first and said second branch, respectively, to define said difference.

3. A data transmission system for defining the difference in magnitude of two angles comprising means responsive to the impressing thereon of a first multielement permutation code signal combination for producing a first analog voltage the magnitude of which is representative of a first of said angles, means responsive to the impressing thereon of a second multielement permutation code signal combination for producing a second analog voltage the magnitude of which is representative of the second of said angles, means for combining said analog voltages so as to produce an average analog voltage representative of the magnitude of the difference between said angles, said system having a translating circuit for translating the magnitude of said average analog voltage, when said average voltage would define a difference angle $\theta$ greater than 180 degrees, into an average analog voltage which defines an angle equal to 360 degrees minus $\theta$ in a direction opposite from $\theta$.

4. A circuit for performing a mathematical operation in response to the impressing thereon of a first and a second electrical condition corresponding to a first and a second quantity, said first and said second quantity defined by a first and a second multielement permutation code signal combination, respectively, said circuit comprising a potentiometer having a first and a second branch on which said first and said second conditions are impressed, respectively, each of said branches comprising a plurality of lumped impedances and means responsive to said impressing of said conditions for selectively varying said impedances of said branches so as to produce an analog voltage representing the result.

5. In a data transmission system, a first receiver of a first multielement code signal permutation defining the magnitude of a first angle, a second receiver of a second multielement code signal permutation defining the magnitude of a second angle, an angle difference defining circuit having a first means, responsive to the impressing thereon of said first permutation, which, in cooperation with a second means, responsive to the impressing thereon of said second permutation, defines the magnitude of the difference between said angles, said first means being a first arm and said second means being a second arm of a common potentiometer, said first arm having a plurality of switchable impedances responsive to said first multielement code signal permutation, said second arm having a plurality of switchable impedances responsive to said second multielement code signal permutation, and an angle translating circuit having switching means therein, connected to each of said arms, for translating difference angles having a magnitude greater than 180 degrees into appropriate lesser angles, said switching means comprising code combination sensing means responsive to particular elements of paired combinations defining angles whose differences would be greater than 180 degrees for effecting said translation.

References Cited in the file of this patent

UNITED STATES PATENTS

| | | |
|---|---|---|
| 2,381,920 | Miller | Aug. 14, 1945 |
| 2,630,552 | Johnson | Mar. 3, 1953 |
| 2,685,084 | Lippel et al. | July 24, 1954 |
| 2,711,499 | Lippel | June 21, 1955 |
| 2,736,889 | Kaiser et al. | Feb. 28, 1956 |
| 2,775,727 | Kernahan et al. | Dec. 25, 1956 |
| 2,796,566 | Maynard et al. | June 18, 1957 |
| 2,820,937 | Vogiel | Jan. 21, 1958 |
| 2,823,344 | Ragland | Feb. 11, 1958 |

OTHER REFERENCES

Electronic Analog Computers, Korn and Korn, Figure 17c, page 11 (1952).

Pub. II, Farrand: An Accurate Digital Analogue Function Generator Proc. of Symposium on Elect. Comp., Los Angeles in April 1952, November 1952.